United States Patent [19]
Wu

[11] Patent Number: 5,647,902
[45] Date of Patent: Jul. 15, 1997

[54] STABILIZED CALCIUM CARBONATE COMPOSITION USING SODIUM CARBONATE AND MIXTURES OF ACIDS AND USES THEREFOR

[75] Inventor: Kuan-Ting Wu, Sandersville, Ga.

[73] Assignee: ECC International Inc., Roswell, Ga.

[21] Appl. No.: 546,493

[22] Filed: Oct. 20, 1995

[51] Int. Cl.$^6$ .............................. C09C 1/02; D21H 17/69
[52] U.S. Cl. .................. 106/464; 106/465; 162/181.1; 162/158
[58] Field of Search ............................ 106/464, 465; 162/181.1, 158

[56] References Cited

U.S. PATENT DOCUMENTS

| | | | |
|---|---|---|---|
| 3,989,195 | 11/1976 | Falcon-Steward | 106/464 |
| 4,420,341 | 12/1983 | Ferrigno | 106/465 |
| 5,043,017 | 8/1991 | Passaretti | 106/465 |
| 5,156,719 | 10/1992 | Passaretti | 162/158 |

*Primary Examiner*—Melissa Bonner
*Attorney, Agent, or Firm*—Suzanne Kikel; William C. Mitchell

[57] ABSTRACT

An improved form of calcium carbonate which is acid resistant to enable its use as a filler material in the making of neutral to weakly acid paper, and a process for producing this acid resistant calcium carbonate are provided. This acid resistant calcium carbonate comprises a mixture of at least about 0.1 percent, based on the dry weight of the calcium carbonate, of sodium carbonate, together with at least about 0.1 percent, based on the dry weight of the calcium carbonate, of a mixture of weak acids in admixture with the calcium carbonate.

11 Claims, 9 Drawing Sheets

STABILIZED CALCIUM CARBONATE COMPOSITION USING SODIUM CARBONATE AND MIXTURES OF ACIDS AND USES THEREFOR

BACKGROUND OF THE INVENTION

This invention relates generally to calcium carbonate for use in papermaking, and related industries, and more particularly to a calcium carbonate having acid resistant properties.

Titanium dioxide and calcined clay have traditionally been utilized as filler materials in the preparation of neutral to weakly acidic paper in order to improve the optical properties, especially the brightness, of the resultant product. These materials, however, especially titanium dioxide, have the disadvantage of being very expensive, resulting in higher manufacturing costs and an uncompetitively priced paper product.

Calcium carbonate, particularly precipitated calcium carbonate, has been used as a filler material in the making of alkaline paper. Such usage results in a paper with enhanced optical properties, without the expense incurred in using titanium oxide fillers, resulting in a much less expensive product. Calcium carbonate, however, cannot generally be used as a filler in acidic paper because it decomposes in an acidic environment. Consequently, there has long been a need to develop a calcium carbonate composition which is acid stabilized and resistant to decomposition at low pH, so that it can be utilized as a filler material in the manufacture of acidic paper, such as groundwood paper, where the use of an alkaline filler would have a negative impact on the final paper properties.

Paper made from mechanical pulps has been traditionally produced under acidic papermaking conditions because of "fiber alkaline darkening" that occurs as pH rises. This means that there is a reduction in brightness of the paper (brightness reversion) when the pH is raised from acid to alkaline in wood-containing systems. Alkaline darkening will occur to some degree in any wood pulps with significant lignin content. The degree of darkening depends on the particular pulps, pH, and water quality. In general, ground calcium carbonate and precipitated calcium carbonate fillers buffer wet end in the 7.5-8.2 pH range. Acid-resistant calcium carbonate compositions thus provide a means for reducing the degree of fiber alkaline darkening and brightness reversion due to their ability to maintain a stabilized pH.

U.S. Pat. No. 5,043,017 discloses and claims an acid-stable calcium carbonate resistant to degradation in a mildly acidic environment which comprises a mixture of a calcium-chelating agent or a conjugate base, and a weak acid, such that calcium carbonate is coated by, and is in equilibrium with, the calcium-chelating agent or conjugate base and the weak acid. Preferred calcium carbonate compositions contain sodium hexametaphosphate and phosphoric acid.

OBJECTS OF THE INVENTION

It is an object of the present invention to provide stabilized and acid resistant calcium carbonate composition especially suitable for use in papermaking applications.

It is a further object of the present invention to provide a process for the preparation of the aforesaid calcium carbonate compositions.

A still further object of the present invention is to provide a paper having enhanced optical qualities prepared using the calcium carbonate compositions of the present invention.

SUMMARY OF THE INVENTION

The present invention relates to an improved form of calcium carbonate which is stabilized and thus, acid resistant, to enable its use as a filler material in the making of neutral to weakly acid paper, and a process for producing this acid resistant calcium carbonate. More particularly, this invention concerns an acid resistant calcium carbonate comprising a mixture of at least about 0.1 percent, based on the dry weight of the calcium carbonate, of sodium carbonate together with at least about 0.1 percent, based on the dry weight of the calcium carbonate, of a mixture of two or more weak acids, in admixture with the calcium carbonate. It has surprisingly been found that the inclusion of the sodium carbonate and the mixture of two or more weak acids confers a higher degree of stability and acid resistance for calcium carbonate in the presence of fiber slurry, and a longer term of pH stability than the prior art acid-stabilized calcium carbonate compositions.

DETAILED DESCRIPTION OF THE INVENTION

Figure 1:
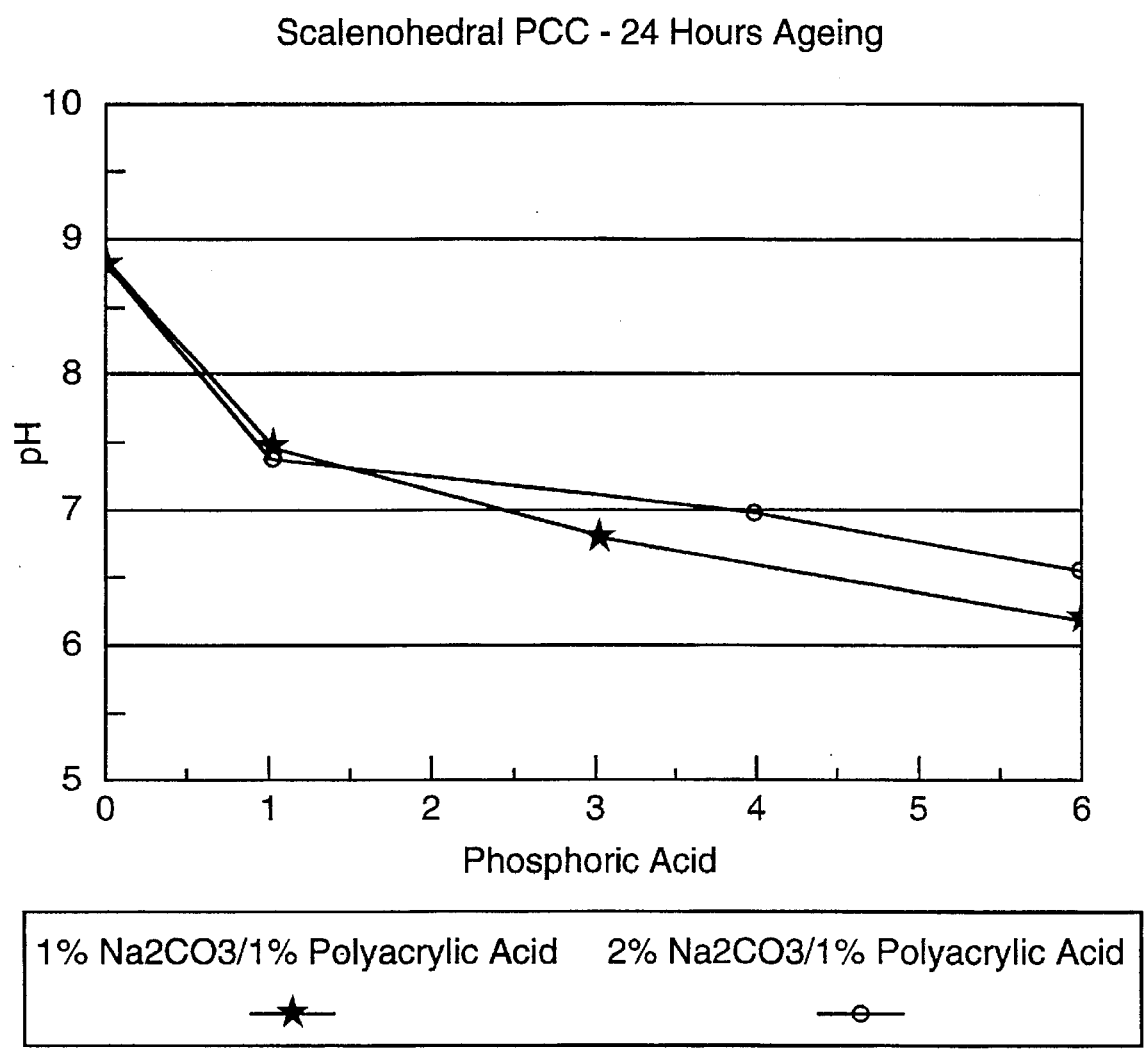
FIG. 1 is a graph comparing the 24 hours ageing of scalenohedral precipitated calcium carbonate compositions of the present invention using 1-2% sodium carbonate, 1% polyacrylic acid and various concentrations of phosphoric acid.

The improved form of calcium carbonate prepared by the instant invention is stabilized, and thus, acid resistant, to enable its use as a filler material in the making of neutral to weakly acid paper. While not wishing to be bound by any particular theory as to the operability of the present invention, it is believed that the acid resistance conferred upon the calcium carbonate compositions of the present invention is a result of the inactivation of the surface of the calcium carbonate by the addition of the sodium carbonate and the mixtures of the two weak acids. The combination of the two weak acids apparently results in a synergistic relationship since the results shown in the FIGURES indicates that a greater stability and acid resistance is afforded by the use of two acids when compared to the same weight percent of a single acid.

In the practice of the present invention, the calcium carbonate compositions are rendered acid resistant by the inclusion of at least about 0.1 percent, based on the dry weight of the calcium carbonate, of sodium carbonate together with at least about 0.1 percent, based on the dry weight of the calcium carbonate, of a mixture of two or more weak acids. Especially preferred as one component of the mixture of weak acids is an organic, polymeric weak acid, such as polyacrylic or polymaleic acid.

While not wishing to be bound by any theory, it is believed that the capability of the acid-stabilized calcium carbonate of the present invention to resist dissociation in an acidic environment is due to the polymer adsorption on the surface of the calcium carbonate, absorption of polymer functional groups on the calcium carbonate surface, and the formation of a buffering system between anionic functional groups of the polymer and a weak acid, or the polymeric acid and the weak base. This mechanism of polymer adsorption is distinct from absorption or reaction of the prior art sodium hexametaphosphate on the surface of calcium carbonate. Polymer adsorption can provide a barrier coating on the surface of calcium carbonate which reduces the dissolution reaction of calcium carbonate. On the other hand, the absorption or reaction of sodium hexametaphosphate is limited to the surface of the calcium carbonate.

The sodium carbonate utilized in the compositions of the present invention is commercially available in forms suitable for direct inclusion into the calcium carbonate mixture. The amount of the sodium carbonate utilized is at least 0.1 percent, based on the dry weight of the calcium carbonate, and is preferably about 1 to about 6 percent, based on the dry weight of calcium carbonate.

The weak acids utilized in the compositions of the present invention are preferably weak acids selected from the group consisting of phosphoric acid, metaphosphoric acid, hexametaphosphoric acid, ethylenediaminetetraacetic acid (EDTA), citric acid, sulfurous acid, boric acid, acetic acid, and weak acids derived from organic polymeric acids, such as polyacrylic acid, polymaleic acid and polycarboxylic acid. As noted hereinbefore, the mixture of weak acids preferably contains at least one weak acid which is derived from an organic, polymeric acid. These organic polymeric acids are typically an organic polymer having a weight average molecular weight, $M_w$, in the range of 750–1,000,000, consisting of regularly repeating units or chemically similar units, connected by primary covalent bonds. The total amount of the weak acids utilized is at least 0.1 percent, based on the dry weight of the calcium carbonate, and is preferably about 1 to about 8 percent, based on the dry weight of the calcium carbonate.

Preferred combinations of sodium carbonate and weak acids for use in the present invention include sodium carbonate/polyacrylic acid/phosphoric acid and sodium carbonate/polymaleic acid/phosphoric acid.

The calcium carbonate utilized is preferably finely divided and it can be either a precipitated calcium carbonate or a natural ground limestone.

The process for producing this acid resistant calcium carbonate involves first forming a mixture of calcium carbonate with at least about 0.1 percent, based on the dry weight of the calcium carbonate, of the sodium carbonate to be utilized. Then, at least about 0.1 percent, based on the dry weight of the calcium carbonate, of the mixture of weak acids is added to this resultant mixture.

Finally, the resultant mixture is blended for a sufficiently long period of time to ensure uniform mixing of the ingredients.

The calcium carbonate can be utilized in the above-described process either as a dry powder or an aqueous slurry with up to about 60 percent by weight solids content.

The sodium carbonate can be utilized in the instant process either as a dry solid or as an aqueous solution. When the calcium carbonate is used in dry powder form, it is preferable to utilize an aqueous solution of the sodium carbonate in order to facilitate homogeneous mixing. Where a slurry of the calcium carbonate is utilized, the solid form of the sodium carbonate readily dissolves therein so that an aqueous solution is unnecessary.

The weak acids can be utilized in the process of preparation in either pure concentrated forms or as aqueous solutions.

In a preferred embodiment of the instant process, the sodium carbonate is first added to the calcium carbonate slurry followed by the polymeric acid or phosphoric acid, and then finally, the second acid. Alternately, the sodium carbonate, polymeric acid, and phosphoric acid can be added at the same time, or the sodium carbonate, polymeric acid, and phosphoric acid can be used mixed together and then added to the calcium carbonate.

The composition of the present invention can be utilized to improve the optical properties of neutral to weakly acidic paper by its addition to the paper during standard manufacturing processes. Typically, the calcium carbonate composition of the present invention is added to a first paper furnish containing components necessary for making acidic paper to thereby form a second paper furnish.

The invention will be further illustrated by the following Examples, which are to be considered illustrative of the invention, and not limited to the precise embodiments shown.

EXAMPLE 1

Scalenohedral Precipitated Calcium Carbonate

Acid stabilized scalenohedral precipitated calcium carbonate slurry can be obtained by the addition of a weak base such as sodium carbonate, followed by the addition of a weak acid such as phosphoric acid and a polymeric acid such as polyacrylic acid. Initially, 1% or 2% sodium carbonate, based on the dry weight of calcium carbonate, was added into 19.7% solids slurry of scalenohedral precipitated calcium carbonate. The pH of untreated scalenohedral precipitated calcium carbonate slurry was 8.83. After mixing, 1–6% phosphoric acid and 1% polyacrylic acid, based on the dry weight of calcium carbonate, were added. A plot of the pH was measured for each sample after 24 hours ageing as shown in FIG. 1. A composition containing 1% sodium carbonate, based on the dry weight of calcium carbonate, and 6% phosphoric acid and 1% of polyacrylic acid, based on the dry weight of calcium carbonate was found to have an initial pH 5.35, and a pH of 6.19 after 24 hours ageing.

EXAMPLE 2

Scalenohedral Precipitated Calcium Carbonate

Figure 2:
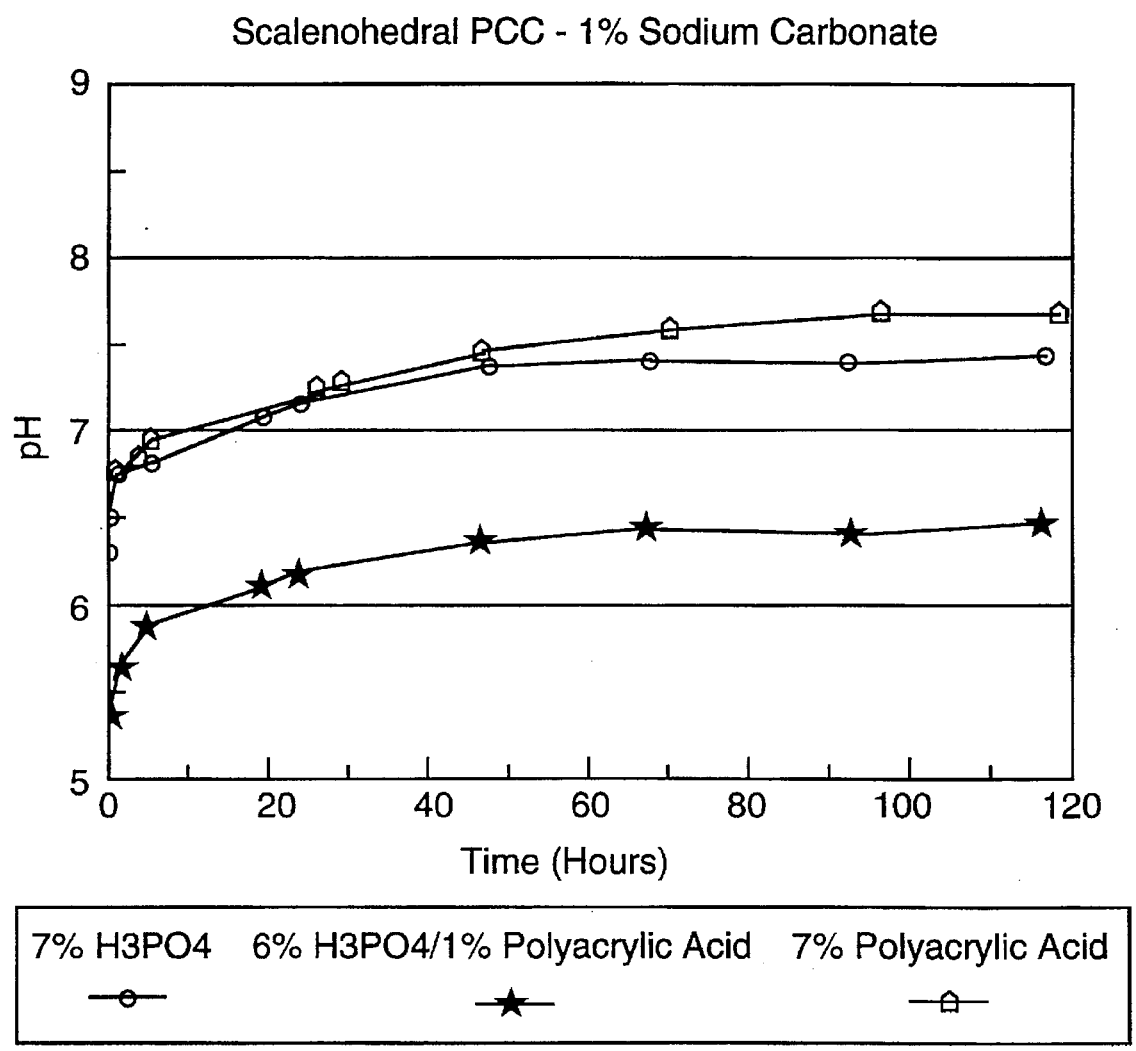
FIG. 2 is a graph comparing the pH of a scalenohedral precipitated calcium carbonate composition of the present invention using 1% sodium carbonate/1% polyacrylic acid/6% phosphoric acid, to the pH of a composition using 1% sodium carbonate/7% phosphoric acid, or 1% sodium carbonate/7% polyacrylic acid.

Acid stabilized scalenohedral precipitated calcium carbonate slurry can be obtained by the addition of a weak acid such as sodium carbonate, followed by the addition of a mixture of weak acids such as phosphoric acid and a polymeric acid such as polyacrylic acid. In addition, acid stabilized calcium carbonate can be prepared with a weak base such as sodium carbonate and a weak acid such as phosphoric acid. Initially, 1% sodium carbonate, based on the dry weight of calcium carbonate, was added into 19.7% solids slurry of scalenohedral precipitated calcium carbonate. The pH of the untreated scalenohedral precipitated calcium carbonate slurry was 8.83. After mixing, 7% phosphoric acid, 7% polyacrylic acid or 6% phosphoric acid/1% polyacrylic acid, based on the dry weight of calcium carbonate, were added. The pHs of the calcium carbonate slurries are measured over a period of 120 hours ageing and shown graphically in FIG. 2. The initial pH of the slurry with 1% $Na_2CO_3$/6% $H_3PO_4$/1% polyacrylic acid treatment was measured and found to be 5.35, and then measured after 115 hours ageing and found to be 6.47. On the other hand, the initial pH of the calcium carbonate slurry containing 1% $Na_2CO_3$/7% $H_3PO_4$ was measured and found to be 6.30, and, after 115 hours ageing was found to be 7.45. The pH difference was thus 0.98 unit after 115 hours ageing, which is significantly different. In addition, the pH of calcium carbonate treated with 1% $Na_2CO_3$/7% polyacrylic acid was 1.24 unit higher than that treated with 1% $Na_2CO_3$/6% $H_3PO_4$/1% polyacrylic acid after 115 hours ageing.

EXAMPLE 3

Scalenohedral Precipitated Calcium Carbonate

Figure 3:
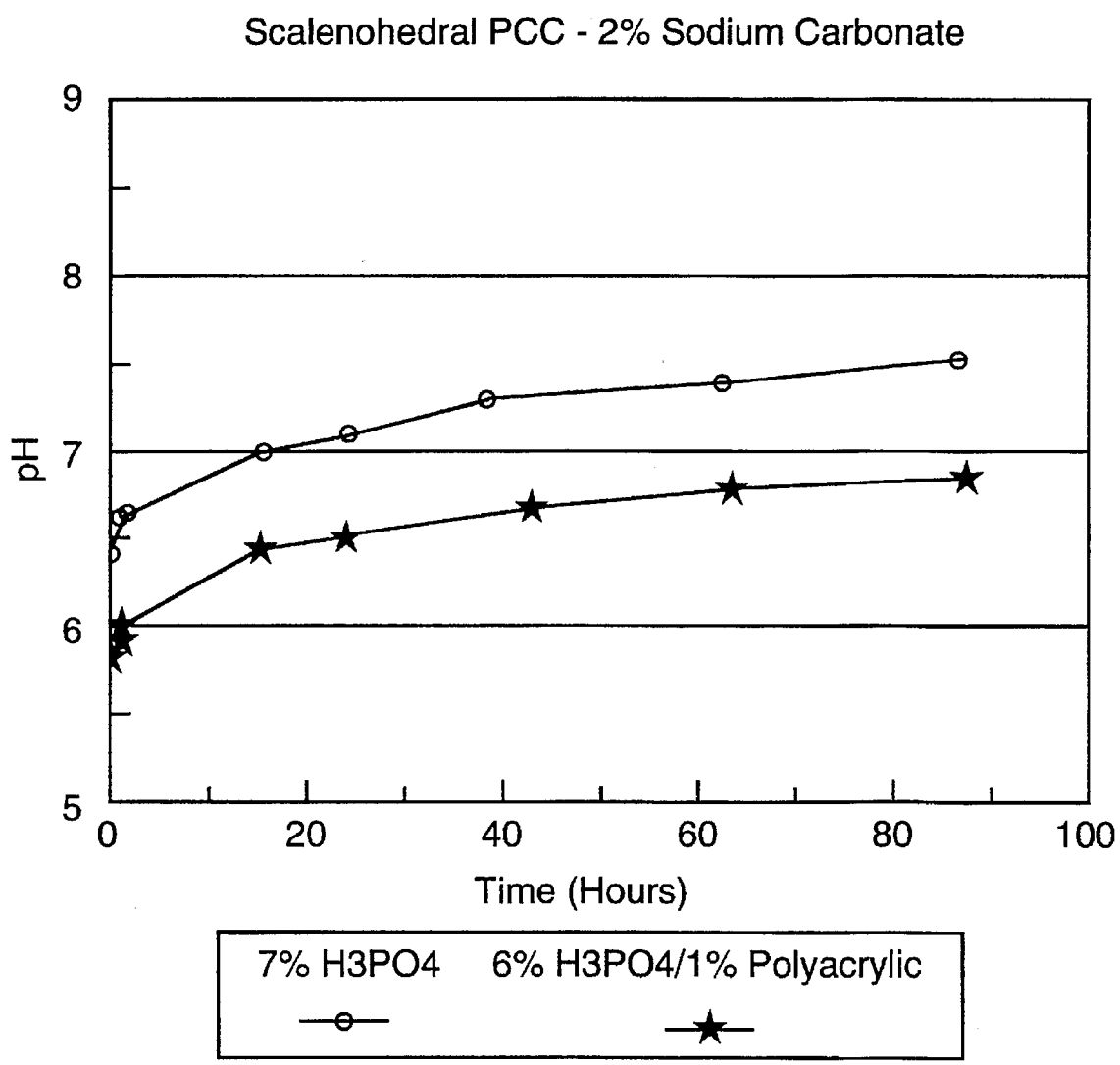
FIG. 3 is a graph comparing the pH of a scalenohedral precipitated calcium carbonate composition of the present invention using 2% sodium carbonate/1% polyacrylic acid/6% phosphoric acid, to the pH of a composition using 2% sodium carbonate/7% phosphoric acid.

Acid stabilized scalenohedral precipitated calcium carbonate slurry can be obtained by the addition of sodium carbonate, followed by the addition of a weak acid such as phosphoric acid and a polymeric acid such as polyacrylic acid. For comparison, an acid stabilized calcium carbonate composition can be prepared using sodium carbonate and a weak acid such as phosphoric acid. Initially, 2% sodium carbonate, based on the dry weight of calcium carbonate, was added into 19.7% solids slurry of scalenohedral precipitated calcium carbonate. The pH of untreated scalenohedral precipitated calcium carbonate slurry was 8.83. After mixing, 7% phosphoric acid, or 6% phosphoric acid/1% polyacrylic acid, based on the dry weight of calcium carbonate, were added. The results indicated that the pHs of calcium carbonate slurries treated with 2% $Na_2CO_3$/6% $H_3PO_4$/1% polyacrylic acid were lower than the pHs of calcium carbonate slurry treated with 2% $Na_2CO_3$/7% $H_3PO_4$ after 90 hours ageing, as shown in FIG. 3. The initial pH of the calcium carbonate slurry with 2% $Na_2CO_3$/6% $H_3PO_4$/1% polyacrylic acid treatment was measured and found to be 5.82, and, after 88 hours ageing was again measured and found to be 6.88. In comparison, the initial pH of the slurry containing 2% $Na_2CO_3$/7% $H_3PO_4$ was measured and found to be 6.41, and 88 hours ageing was remeasured and found to be 7.56. The pH difference was thus 0.68 unit after 88 hours ageing, which is significantly different.

EXAMPLE 4

Rhombic Precipitated Calcium Carbonate

Figure 4:
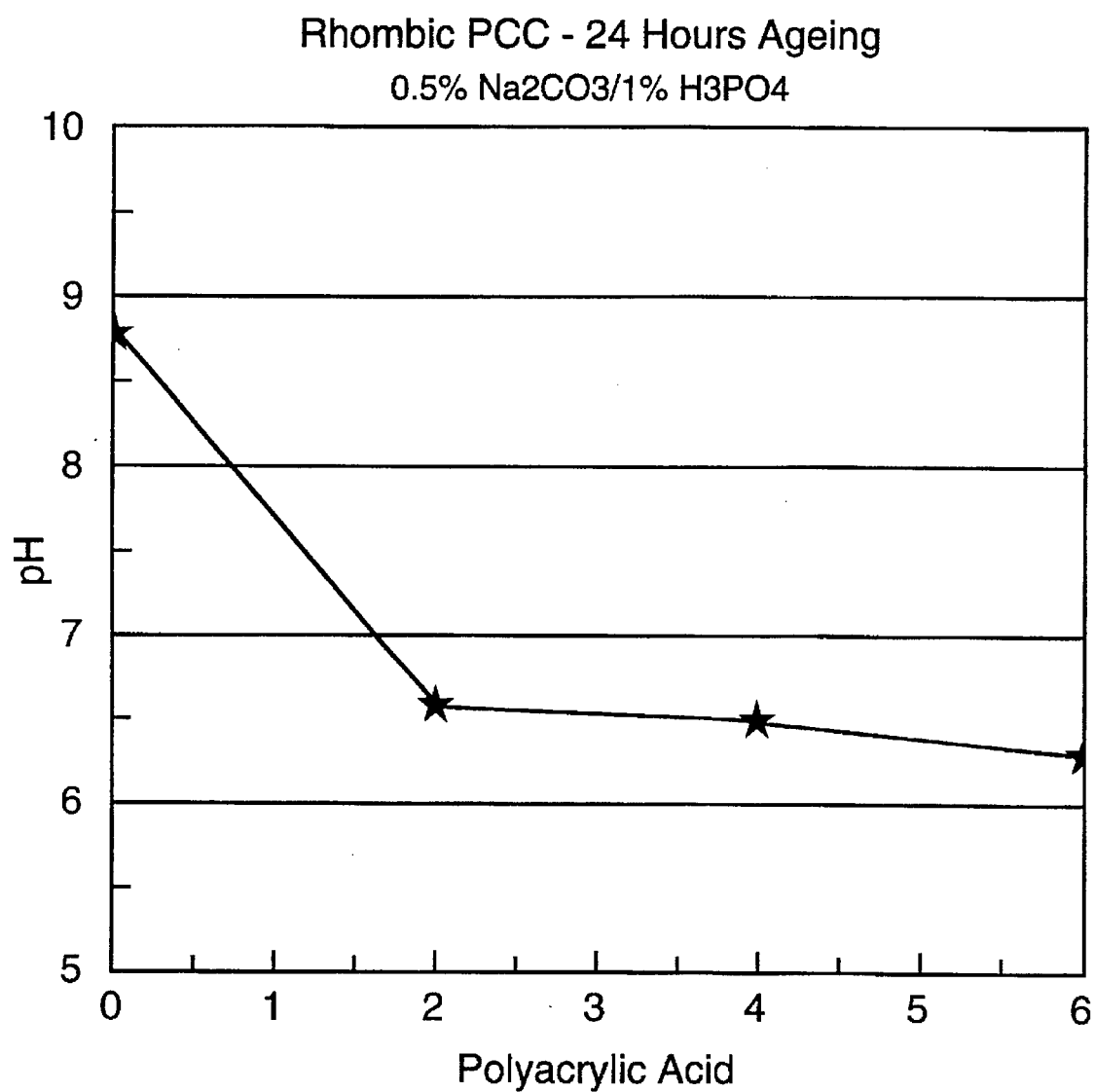
FIG. 4 is a graph showing the 24 hours ageing of rhombic precipitated calcium carbonate compositions of the present invention using 0.5% sodium carbonate/1% phosphoric acid, with various concentrations of polyacrylic acid.

The initial pH of rhombic precipitated calcium carbonate was 8.79. First, 0.5% sodium carbonate, based on the dry weight of calcium carbonate, was added into 18.2% solids slurry of rhombic precipitated calcium carbonate. After blending, 1% phosphoric acid and 2%–6% polyacrylic acid, based on the dry weight of calcium carbonate, were added. The pH measurement was monitored for 24 hours ageing and the results are as shown in FIG. 4. One of the examples showed that the initial pH of rhombic precipitated calcium carbonate slurry treated with 0.5% $Na_2CO_3$/1% $H_3PO_4$/4% polyacrylic acid was 6.03, and the pH of the slurry was found to be 6.50 after 24 hours ageing.

EXAMPLE 5

Rhombic Precipitated Calcium Carbonate

Figure 5:
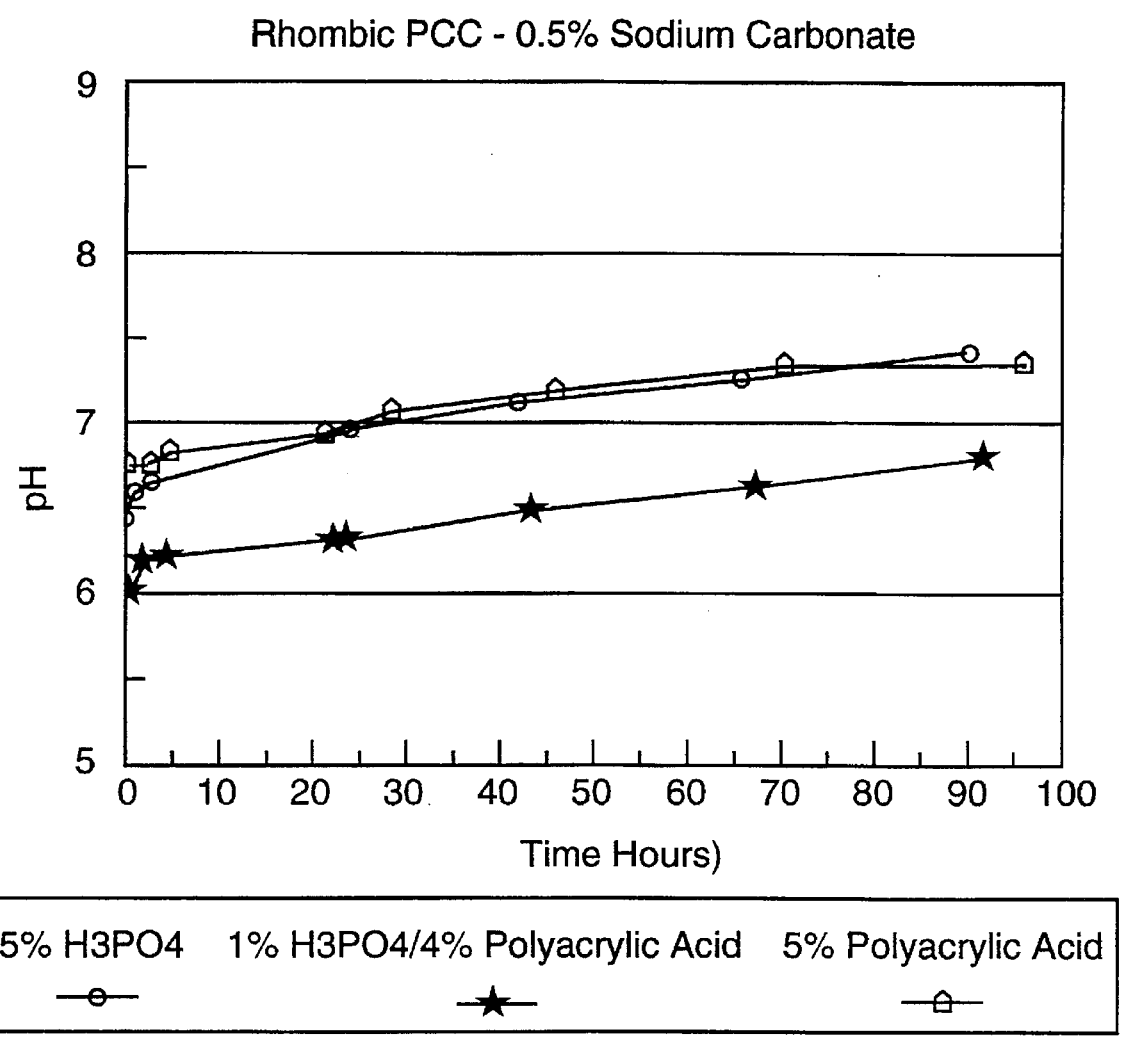
FIG. 5 is a graph comparing the pH of a rhombic precipitated calcium carbonate composition containing 0.5% sodium carbonate/4% polyacrylic acid/1% phosphoric acid, to the pH of a composition containing 0.5% sodium carbonate/5% phosphoric acid, or 0.5% sodium carbonate/5% polyacrylic acid.

The initial pH of rhombic precipitated calcium carbonate was 8.79. First, 0.5% sodium carbonate, based on the dry weight of calcium carbonate, was added into 18.2% solids slurry of rhombic precipitated calcium carbonate. After blending 1% phosphoric acid/4% polyacrylic acid, 5% polyacrylic acid or 5% phosphoric acid, based on the dry weight of calcium carbonate, was added. The initial pH of the slurry with 0.5% $Na_2CO_3$/1% $H_3PO_4$/4% polyacrylic acid treatment was measured and found to be 6.03, and, upon remeasurement 90 hours ageing, was found to be 6.80, as shown in FIG. 5. On the other hand, the initial pH of the slurry containing 0.5% $Na_2CO_3$/5% $H_3PO_4$ was measured and found to be 6.59, and after 90 hours ageing was found to be 7.43. The pH difference was thus 0.63 unit after 90 hours ageing, which is significantly different. Also, the pH of calcium carbonate slurry treated with 0.5% $Na_2CO_3$/5% polyacrylic acid was 0.57 unit higher than that treated with 0.5% $Na_2CO_3$/1% $H_3PO_4$/4% polyacrylic acid after 90 hours ageing.

EXAMPLE 6

Ground Calcium Carbonate

Figure 6:
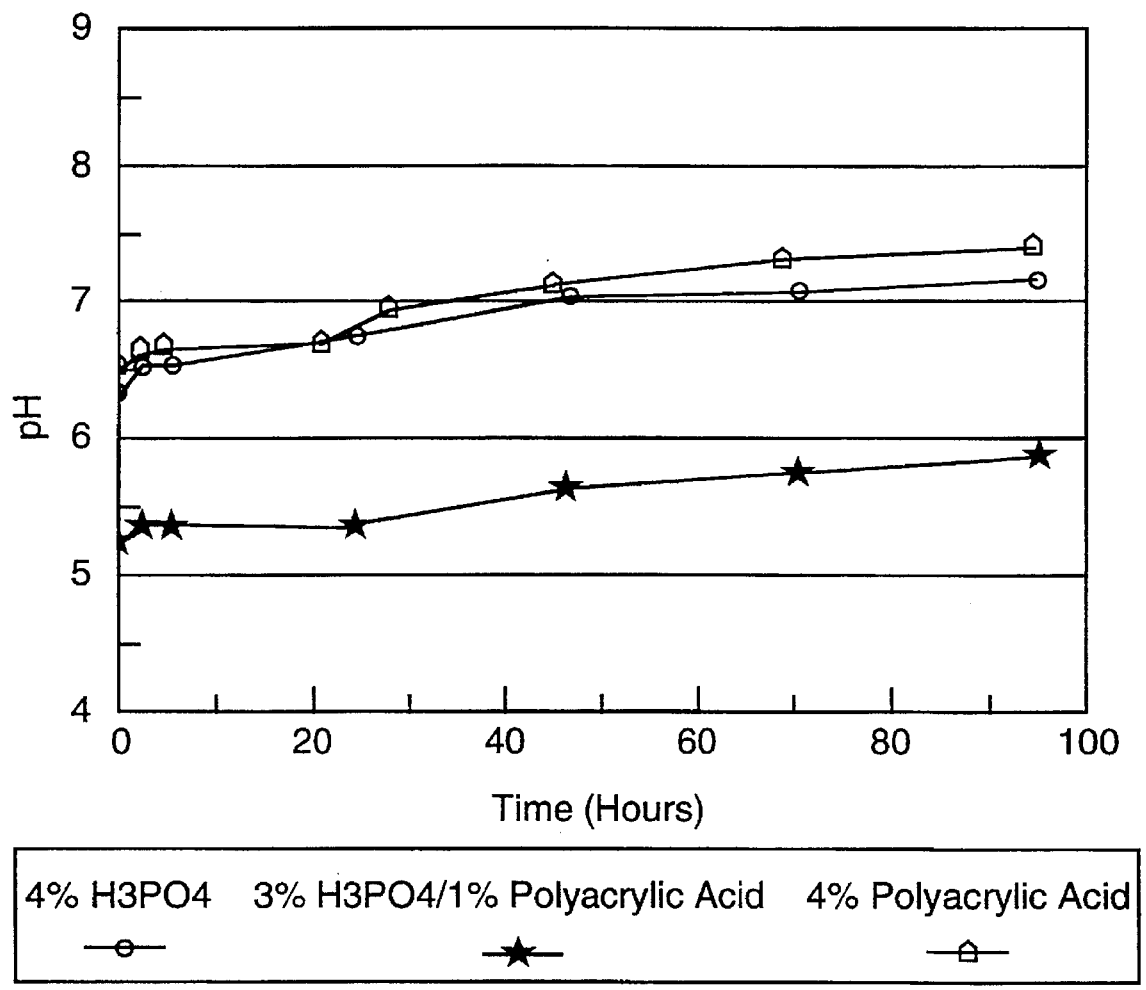
FIG. 6 is a graph comparing the pH of a ground calcium carbonate composition containing 0.5% sodium carbonate/1% polyacrylic acid/3% phosphoric acid, to the pH of a composition containing 0.5% sodium carbonate/4% phosphoric acid, or 0.5% sodium carbonate/4% polyacrylic acid.

The initial pH of ground calcium carbonate was 8.01. Initially, 0.5% sodium carbonate, based on the dry weight of calcium carbonate, was added into 20% solid slurry of ground calcium carbonate. After blending, 4% phosphoric acid, 4% polyacrylic acid or 3% phosphoric acid/1% polyacrylic acid, based on the dry weight of calcium carbonate, was added. The initial pH of the slurry containing 0.5% $Na_2CO_3$/3% $H_3PO_4$/1% polyacrylic acid was measured and found to be 5.24, and after 95 hours ageing was found to be 5.86, as shown graphically in FIG. 6. In comparison, the initial pH of the slurry with 0.5% $Na_2CO_3$/4% $H_3PO_4$ and 0.5% $Na_2CO_3$/4% polyacrylic acid was measured and found to be 6.31 and 6.47, and, after 95 hours ageing, was measured and found to be 7.17 and 7.40. The pH difference was thus 1.31 and 1.54 unit after 95 hours ageing, which is significantly different.

EXAMPLE 7

Ground Calcium Carbonate

Figure 7:
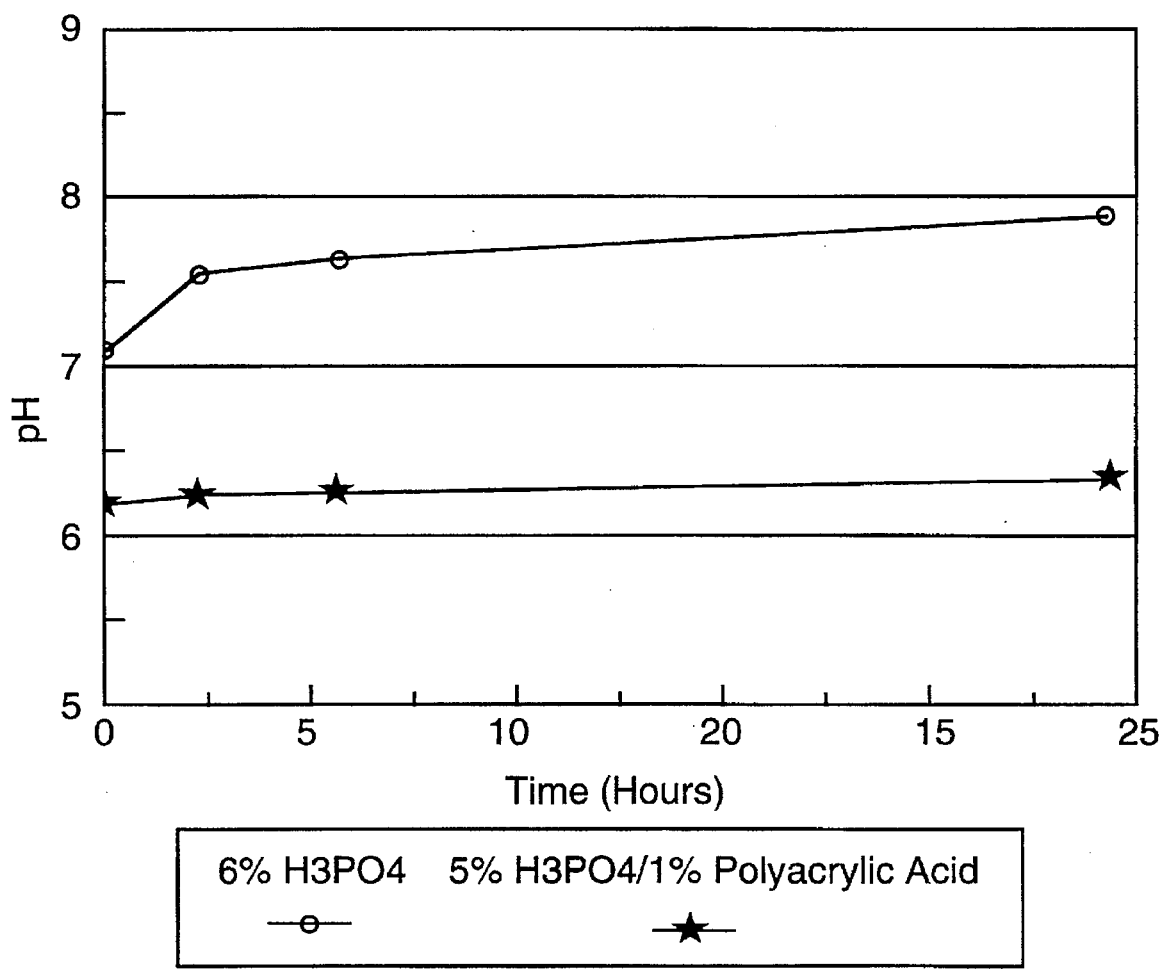
FIG. 7 is a graph comparing the pH of a ground calcium carbonate composition of the present invention using 3% sodium carbonate/1% polyacrylic acid/5% phosphoric acid, to the pH of a composition containing 3% sodium carbonate/6% phosphoric acid.

The initial pH of ground calcium carbonate was 8.01. Initially, 3% sodium carbonate, based on the dry weight of calcium carbonate, was added into a 20% solids slurry of ground calcium carbonate. After blending, 6% phosphoric acid or 5% phosphoric acid/1% polyacrylic acid, based on dry weight of calcium carbonate, was added. The initial pH of slurry with 3%$Na_2CO_3$/5% $H_3PO_4$/1% polyacrylic acid treatment was measured and found to be 6.25, and, when remeasured after 24 hours ageing was found to be 6.37 as shown graphically in FIG. 7. On the other hand, the initial pH of the slurry 3% $Na_2CO_3$/6% $H_3PO_4$ treatment was measured and found to be 7.12, and, when remeasured after 24 hours ageing was found to be 7.89. The pH difference was thus 1.52 units after 24 hours ageing, which is significantly different.

EXAMPLE 8

Ground Calcium Carbonate

Figure 8:
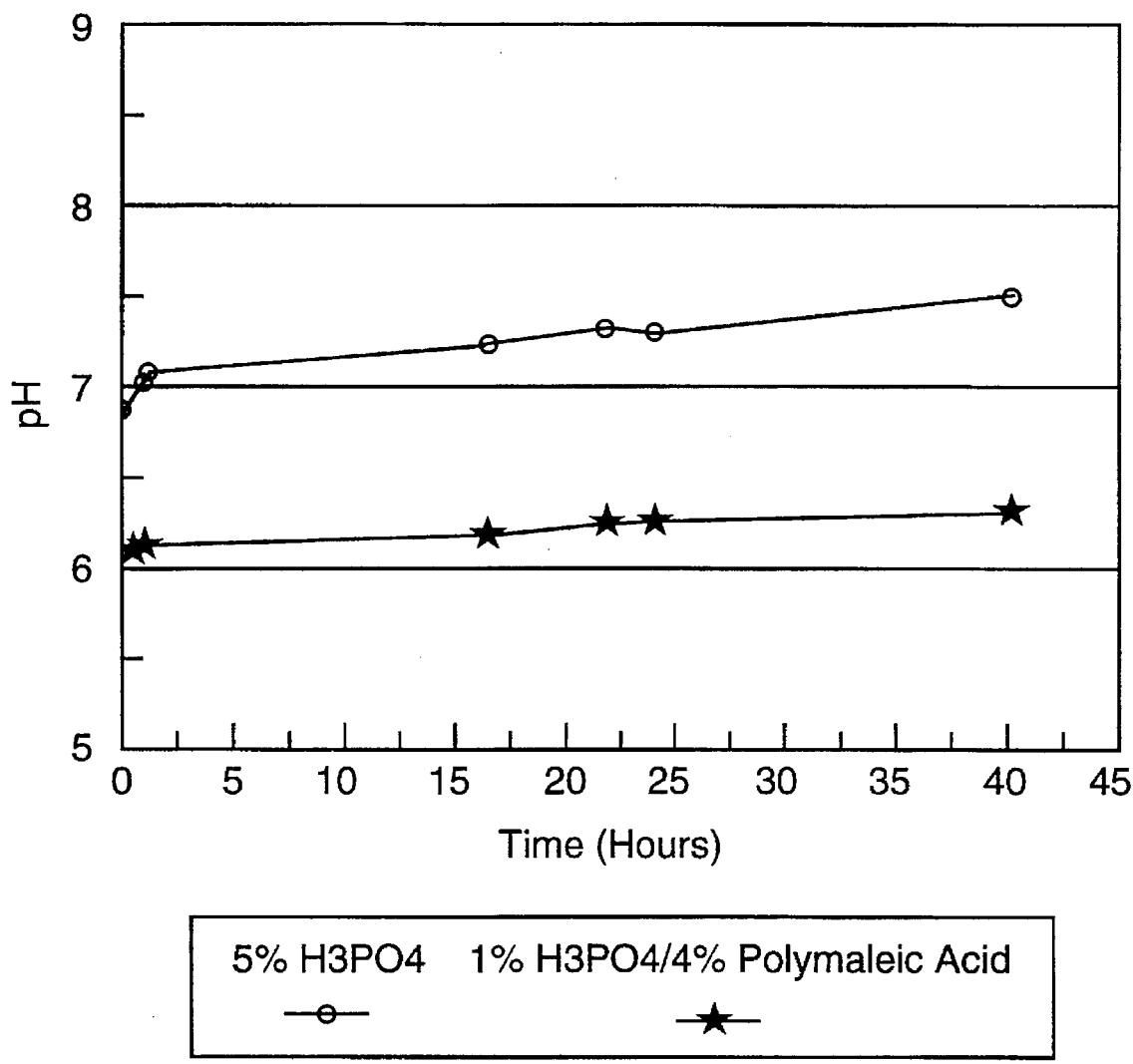
FIG. 8 is a graph comparing the pH of a ground calcium carbonate composition of the present invention using 1% sodium carbonate/4% polymaleic acid/1% phosphoric acid to the pH of a composition containing 1% sodium carbonate with 5% phosphoric acid.

The initial pH of ground calcium carbonate was 8.01. Initially, 1% sodium carbonate, based on the dry weight of calcium carbonate, was added into a 20% solids slurry of ground calcium carbonate. After blending, 5% phosphoric acid or 1% phosphoric acid/4% polymaleic acid, based on the dry weight of calcium carbonate, was added. The initial pH of the slurry with 1% $Na_2CO_3$/1% $H_3PO_4$/4% polymaleic acid treatment was measured and found to be 6.08, and, when remeasured 40 hours ageing was found to have a pH of 6.30 as shown graphically in FIG. 8. In comparison, the initial pH of the slurry containing 1% $Na_2CO_3$/5% $H_3PO_4$ was measured and found to be 6.87, and, when remeasured after 40 hours ageing was found to be 7.50. The pH difference was thus 1.20 unit after 40 hours ageing, which is significantly different.

EXAMPLE 9

Comparison with Prior Art

Figure 9:
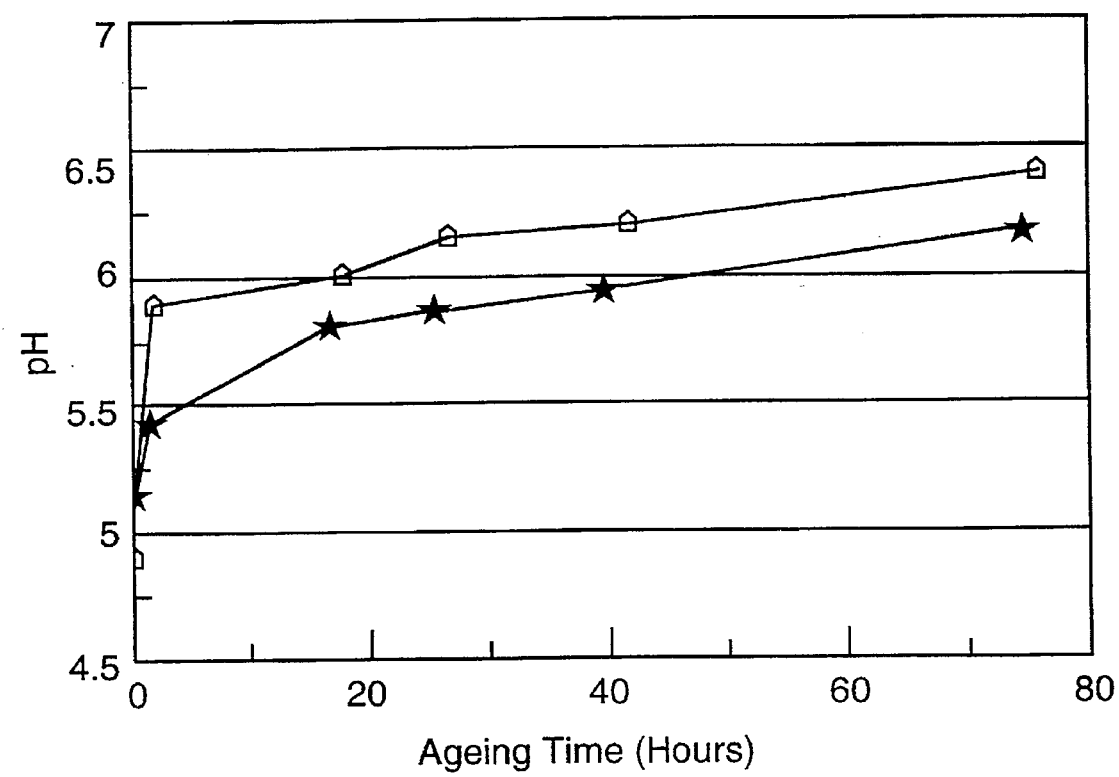
FIG. 9 is a graph comparing the pH of a scalenohedral precipitated calcium carbonate composition of the present invention using 0.5% sodium carbonate/1% polyacrylic acid/6% phosphoric acid, to the pH of a prior art composition which contains 0.5% sodium hexametaphosphate/7% phosphoric acid.

Acid stabilized scalenohedral precipitated calcium carbonate slurry can be obtained by the addition of sodium carbonate, followed by the addition of a mixture of weak acids such as phosphoric acid and polyacrylic acid. Initially, 0.5% sodium carbonate, based on the dry weight of calcium carbonate, was added into 19.7% solids slurry of scalenohedral precipitated calcium carbonate. The pH of untreated scalenohedral precipitated calcium carbonate slurry was 8.83. After mixing, 6% phosphoric acid/1% polyacrylic acid, based on the dry weight of calcium carbonate, was added. A similar composition, based on the teachings of the U.S. Pat. No. 5156719, was prepared using 0.5% sodium hexametaphosphate and 7% phosphoric acid. The initial pH of the slurry containing 0.5% sodium hexametaphosphate/7% phosphoric acid was 4.91, and was found to be 6.41 after 75 hours ageing, as shown graphically in FIG. 9. In comparison, the initial pH of the slurry containing 0.5% sodium carbonate/6% phosphoric acid/1% polyacrylic acid was 5.15, and was found to be 6.17, after 75 hours ageing. These results indicate that the compositions of the present invention are superior to those of the prior art U.S. Pat. No. 5156719.

What is claimed is:

1. An acid resistant calcium carbonate comprising a mixture of about 1 to about 6 percent, based on the dry weight of the calcium carbonate, of sodium carbonate together with at least about 0.1 percent, based on the dry weight of the calcium carbonate, of a mixture of two or more weak acids, in admixture with the calcium carbonate.

2. The acid resistant calcium carbonate of claim 1 wherein the weak acids are selected from the group consisting of polyacrylic acid, polymaleic acid and phosphoric acid.

3. The acid resistant calcium carbonate of claim 2 wherein the mixture of weak acids is comprised of polyacrylic acid and phosphoric acid.

4. The acid resistant calcium carbonate of claim 2 wherein the mixture of weak acids is comprised of polymaleic acid and phosphoric acid.

5. The acid resistant calcium carbonate of claim 1 wherein the mixture of weak acids is present in an amount of about 1 to about 8 percent, based on the dry weight of the calcium carbonate.

6. A process for the preparation of an acid resistant calcium carbonate which comprises: a) forming a mixture of calcium carbonate with about 1 to about 6 percent, based on the dry weight of the calcium carbonate, of sodium carbonate: b) adding at least about 0.1 percent, based on the dry weight of the calcium carbonate, of a mixture of two or more weak acids to the mixture; and c) blending the resultant mixture to ensure uniform mixing.

7. The process according to claim 6 wherein the weak acids of the mixture are selected from the group consisting of polyacrylic acid, polymaleic acid and phosphoric acid.

8. The process according to claim 7 wherein the mixture of weak acids is comprised of polyacrylic acid and phosphoric acid.

9. The process according to claim 7 wherein the mixture of weak acids is comprised of polymaleic acid and phosphoric acid.

10. The process according to claim 7 wherein the mixture of weak acids is present in an amount of about 1 to about 8 percent, based on the dry weight of the calcium carbonate.

11. A method of improving the optical properties of neutral to weakly acidic paper by the addition of an acid resistant calcium carbonate comprising a mixture of at least about 0.1 percent, based on the dry weight of the calcium carbonate, of sodium carbonate together with at least about 0.1 percent, based on the dry weight of the calcium carbonate, of a mixture of two or more weak acids, in admixture with the calcium carbonate.

* * * * *